(12) United States Patent
Park

(10) Patent No.: US 9,330,446 B2
(45) Date of Patent: May 3, 2016

(54) METHOD AND APPARATUS FOR PROCESSING IMAGE

(71) Applicant: HANWHA TECHWIN CO., LTD., Changwon-Si (KR)

(72) Inventor: Jong-Seon Park, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 281 days.

(21) Appl. No.: 13/953,971

(22) Filed: Jul. 30, 2013

(65) Prior Publication Data

US 2014/0270487 A1  Sep. 18, 2014

(30) Foreign Application Priority Data

Mar. 12, 2013 (KR) .................. 10-2013-0026302

(51) Int. Cl.
| | |
|---|---|
| *H04N 5/228* | (2006.01) |
| *G06T 5/50* | (2006.01) |
| *G06T 5/00* | (2006.01) |
| *H04N 5/235* | (2006.01) |
| *H04N 5/232* | (2006.01) |

(52) U.S. Cl.
CPC . *G06T 5/50* (2013.01); *G06T 5/003* (2013.01); *H04N 5/2355* (2013.01); *G06T 2207/20201* (2013.01); *G06T 2207/20208* (2013.01); *H04N 5/23232* (2013.01)

(58) Field of Classification Search
CPC ............ H04N 5/2355; H04N 5/35581; H04N 5/23264; H04N 5/23277; G06T 5/50; G06T 5/003; G06T 2207/20208
See application file for complete search history.

(56) References Cited

U.S. PATENT DOCUMENTS

| | | | |
|---|---|---|---|
| 6,720,993 B1* | 4/2004 | Hwang et al. ............ 348/208.13 |
| 2007/0171298 A1* | 7/2007 | Kurane ......................... 348/362 |
| 2010/0026823 A1* | 2/2010 | Sawada ....................... 348/222.1 |
| 2012/0124037 A1 | 5/2012 | Lee et al. |

FOREIGN PATENT DOCUMENTS

| | | |
|---|---|---|
| JP | 2005-57489 A | 3/2005 |
| KR | 10-0763656 B1 | 10/2007 |
| KR | 10-2009-0112131 A | 10/2009 |
| KR | 10-2012-0053211 A | 5/2012 |

* cited by examiner

*Primary Examiner* — Kim Vu
*Assistant Examiner* — Michael Vanchy, Jr.
(74) *Attorney, Agent, or Firm* — Sughrue Mion, PLLC

(57) ABSTRACT

Provided are a monitoring system and an operating method thereof, and more particularly, an image processing method and apparatus for removing a motion blur of a wide dynamic range (WDR) image by using a machine learning algorithm. The image processing method includes: generating an overlap image by overlapping a first image having a predetermined exposure time and a second image having an exposure time different from that of the first image; detecting a region of interest (ROI) in which a motion blur occurs in the overlap image; and performing a motion blur removing operation of changing an image in the ROI to any one of the first image and the second image by applying a first machine learning algorithm.

15 Claims, 13 Drawing Sheets

FIRST MOTION BLUR        SECOND MOTION BLUR

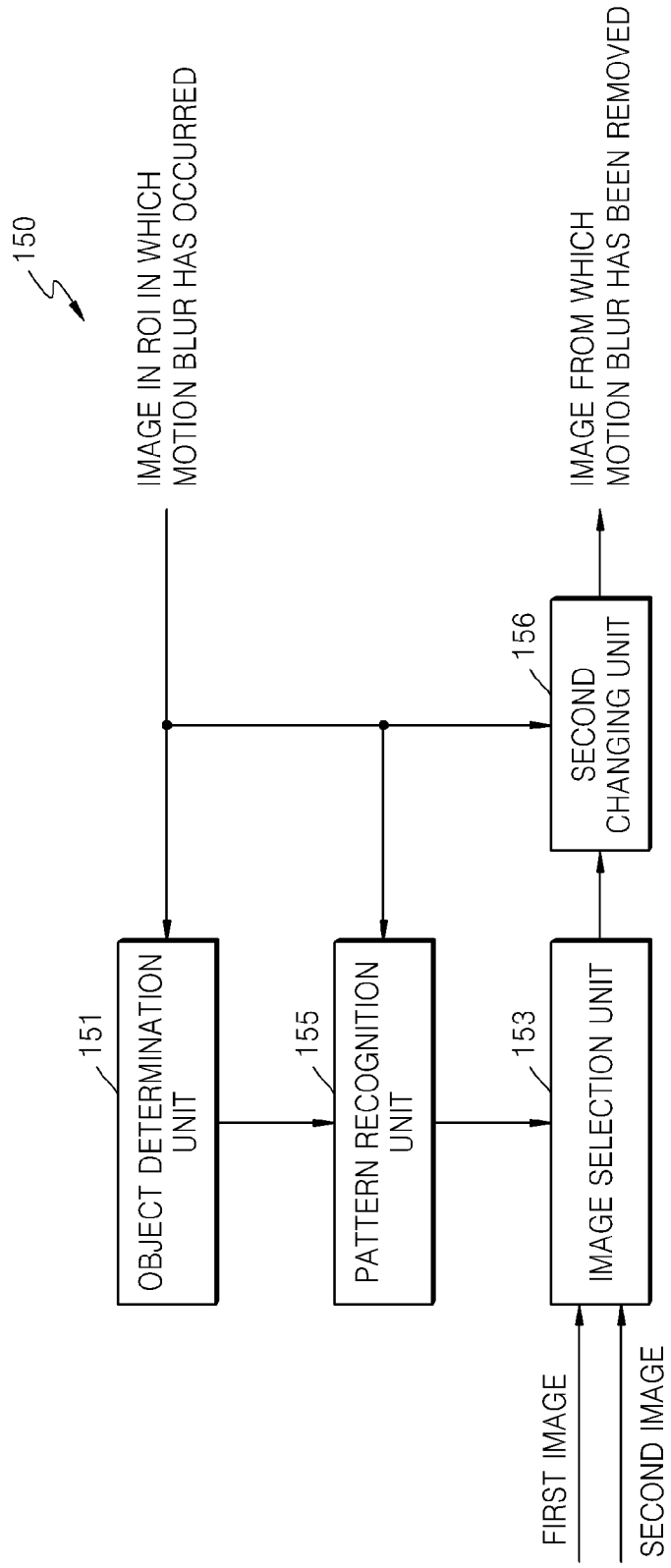

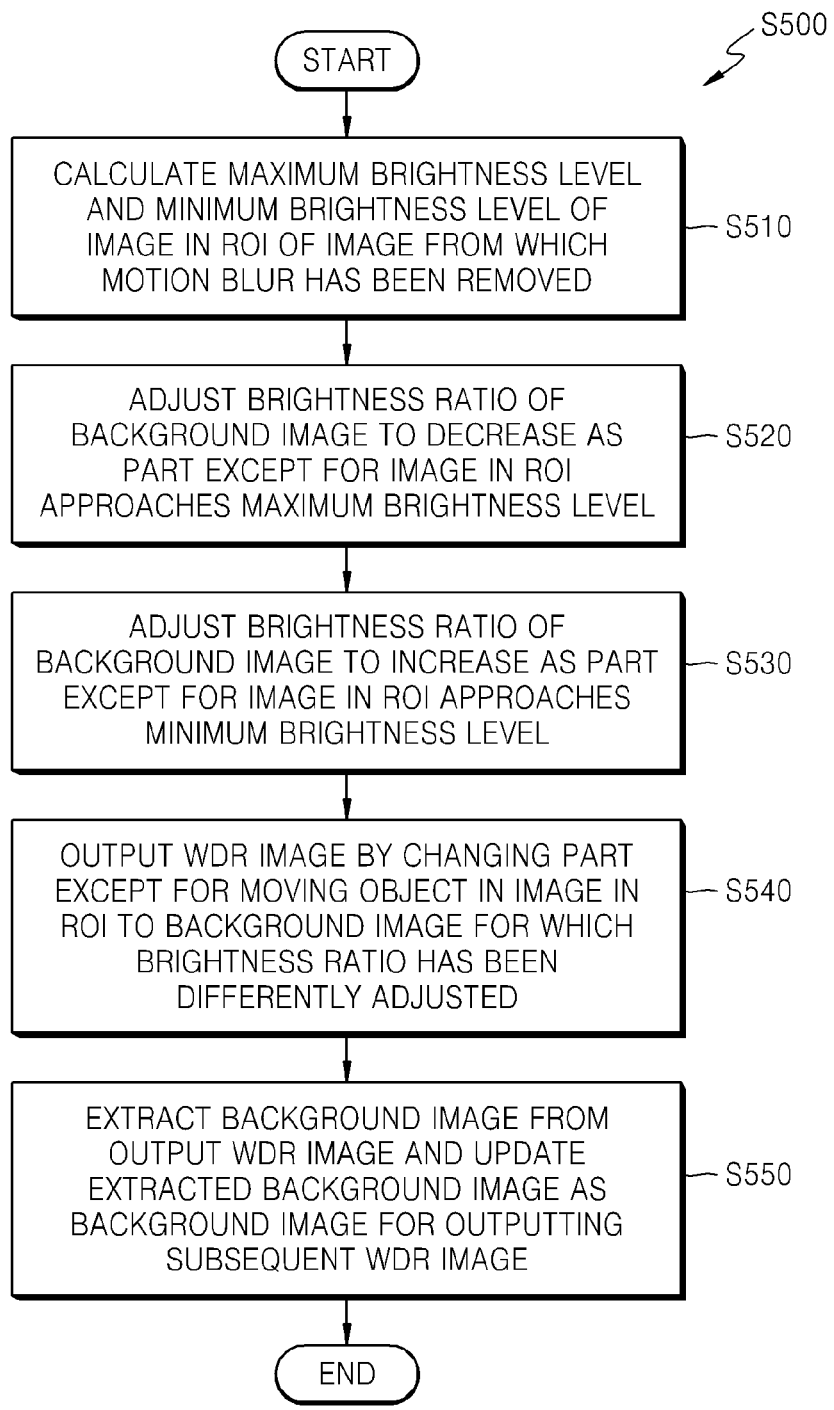

METHOD AND APPARATUS FOR PROCESSING IMAGE

CROSS-REFERENCE TO RELATED PATENT APPLICATION

This application claims priority from Korean Patent Application No. 10-2013-0026302, filed on Mar. 12, 2013, in the Korean Intellectual Property Office, the disclosure of which is incorporated herein in its entirety by reference.

BACKGROUND

1. Field

Apparatuses and methods consistent with exemplary embodiments relate to a monitoring system and an operating method thereof, and more particularly, to an image processing method and apparatus for removing a motion blur of a wide dynamic range (WDR) image by using a machine learning algorithm.

2. Description of the Related Art

In the related art, when a WDR function is performed, a representable brightness band is enlarged by overlapping a long-exposure image and a short-exposure image. In this case, to naturally represent an overlap section, the overlapping is performed by using a method of interpolating the long-exposure image and the short-exposure image. However, a timing difference occurs between when a long-exposure image and a short-exposure image are acquired by an image sensor. Accordingly, when the long-exposure image and the short-exposure image of a moving object are captured and overlapped, double motion blurs occur for the moving object in the overlap image due to the timing difference.

FIG. 1A is a graph showing a range of brightness levels representable in a long-exposure image and a short-exposure image. In general, when a camera captures a long-exposure image, a brightness level of the long-exposure image is represented within a section A-B. Thereafter, the camera captures a short-exposure image, and when the long-exposure image and the short-exposure image are overlapped in a WDR overlay section, a WDR interpolation image capable of representing a wider range of brightness levels is generated. In this case, when the long-exposure image and the short-exposure image are overlapped in the WDR overlay section, a motion blur occurs due to a capturing timing difference between the two images and a motion of an object.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide an image processing method and apparatus for removing a motion blur phenomenon, which occurs when a long-exposure image and a short-exposure image are overlapped in real-time, by using a machine learning algorithm while enlarging a representable dynamic range by using the long-exposure image and the short-exposure image.

According to an aspect of an exemplary embodiment, there is provided a method of processing an image, the method including: generating an overlap image by overlapping a first image having a predetermined exposure time and a second image having an exposure time different from that of the first image; detecting a region of interest (ROI) in which a motion blur occurs in the overlap image; and performing a motion blur removing operation that changes an image in the ROI to any one of the first image and the second image by applying a first machine learning algorithm.

The method may further include performing an output image processing operation that outputs a wide dynamic range (WDR) image by changing a part, excluding an object in the image in the ROI, of an image from which motion blur has been removed to a background image of a previous WDR image by applying a second machine learning algorithm.

The detecting of the ROI may include: detecting an edge in the overlap image; and detecting the ROI including an outline of the detected edge.

The motion blur removing operation may include: determining whether a moving object exists, through ROI image comparison between previous and subsequent frames; calculating a mean brightness level of the image in the ROI when a moving object does not exist in the image in the ROI; changing the image in the ROI to the first image when the mean brightness level is equal to or less than a first threshold; and changing the image in the ROI to the second image when the mean brightness level is greater than the first threshold.

The motion blur removing operation may include: determining whether a moving object exists in the image in the ROI; determining whether the moving object has a learned predetermined pattern when the moving object exists in the image in the ROI; changing the image in the ROI to the first image when it is determined that the moving object has the learned predetermined pattern and when the moving object is a human being; and changing the image in the ROI to the second image when it is determined that the moving object has the learned predetermined pattern and when the moving object is not a human being.

The motion blur removing operation may include: determining whether a moving object exists in the image in the ROI; determining whether the moving object has a learned predetermined pattern when the moving object exists in the image in the ROI; determining a speed of the moving object when it is determined that the moving object does not have the learned predetermined pattern; changing the image in the ROI to the first image when the speed of the moving object is equal to or less than a second threshold; and changing the image in the ROI to the second image when the speed of the moving object is greater than the second threshold.

The output image processing operation may include: calculating a maximum brightness level and a minimum brightness level of the image in the ROI of the image from which motion blur has been removed; differently adjusting a brightness ratio of the previous WDR image to the background image according to the maximum brightness level and the minimum brightness level; and outputting the WDR image by changing the part, excluding the object in the image in the ROI, to the background image for which the brightness ratio has been differently adjusted.

The different adjusting of the brightness ratio may include: decreasing the brightness ratio of the background image as the part, excluding the object in the image in the ROI, approaches the maximum brightness level; and increasing the brightness ratio of the background image as the part, excluding the object in the image in the ROI, approaches the minimum brightness level.

According to another aspect of an exemplary embodiment, there is provided an apparatus configured to process an image, the apparatus including: an overlapping unit configured to generate an overlap image by overlapping a first image having a predetermined exposure time and a second image having an exposure time different from that of the first image; a detection unit configured to detect a region of interest (ROI) in which a motion blur occurs from the overlap image; and a motion blur removing unit configured to change an image in the ROI to any one of the first image and the second image by applying a first machine learning algorithm.

The apparatus may further include an output image processing unit configured to output a WDR image by changing a part, excluding an object in the image in the ROI, of an image from which motion blur has been removed to a background image of a previous WDR image by applying a second machine learning algorithm.

The detection unit may further include an edge detection unit configured to detect an edge from the overlap image, wherein the ROI including an outline of the detected edge is detected.

The motion blur removing unit may include: an object determination unit configured to determine whether a moving object exists, through an ROI image comparison between previous and subsequent frames; a first brightness level calculation unit configured to calculate a mean brightness level of the image in the ROI when a moving object does not exist in the image in the ROI; a selection unit configured to select the first image or the second image according to the mean brightness level; and a first changing unit configured to change the image in the ROI to the first image when the mean brightness level is equal to or less than a first threshold and change the image in the ROI to the second image when the mean brightness level is greater than the first threshold.

The motion blur removing unit may include: an object determination unit configured to determine whether a moving object exists in the image in the ROI; a pattern recognition unit configured to determine whether the moving object is a human being having a learned predetermined pattern when the moving object exists in the image in the ROI; a selection unit configured to select the first image or the second image according to a result of the pattern recognition; and a second changing unit configured to change the image in the ROI to the first image when it is determined that the moving object is a human being and change the image in the ROI to the second image when it is determined that the moving object is not a human being.

The motion blur removing unit may include: an object determination unit configured to determine whether a moving object exists in the image in the ROI; a pattern recognition unit configured to determine whether the moving object has a learned predetermined pattern when the moving object exists in the image in the ROI; a speed determination unit configured to determine a speed of the moving object when it is determined that the moving object does not have the learned predetermined pattern; a selection unit configured to select the first image or the second image according to the speed determination result; and a third changing unit configured to change the image in the ROI to the first image when the speed of the moving object is equal to or less than a second threshold and change the image in the ROI to the second image when the speed of the moving object is greater than the second threshold.

The output image processing unit may include: a second brightness level calculation unit configured to calculate a maximum brightness level and a minimum brightness level of the image in the ROI of the image from which motion blur has been removed; an adjustment unit configured to differently adjust a brightness ratio of the previous WDR image to the background image according to the maximum brightness level and the minimum brightness level; and a fourth changing unit configured to output the WDR image by changing the part, excluding the object in the image in the ROI, to the background image for which the brightness ratio has been differently adjusted.

The adjustment unit may be further configured to decrease the brightness ratio of the background image as the part, excluding the object in the image in the ROI, approaches the maximum brightness level, and may be configured to increase the brightness ratio of the background image as the part, excluding the object in the image in the ROI, approaches the minimum brightness level.

According to another aspect of an exemplary embodiment, there is provided a non-transitory computer-readable storage medium having stored therein program instructions, which when executed by a computer, perform a method of processing an image, the method including: generating an overlap image by overlapping a first image having a predetermined exposure time and a second image having an exposure time different from that of the first image; detecting a region of interest (ROI) in which a motion blur occurs in the overlap image; and a motion blur removing operation of changing an image in the ROI to any one of the first image and the second image by applying a first machine learning algorithm.

BRIEF DESCRIPTION OF THE DRAWINGS

The above and other aspects of will become more apparent by describing in detail exemplary embodiments with reference to the attached drawings, in which:

FIGS. 5A to 5C are block diagrams of a motion blur removing unit in the image processing apparatus of FIG. 3, according to an exemplary embodiment;

FIG. 9 is a flowchart illustrating a method of outputting a final WDR image in the method of FIG. 7, according to an exemplary embodiment.

DETAILED DESCRIPTION OF THE EXEMPLARY EMBODIMENTS

Figure 1A:
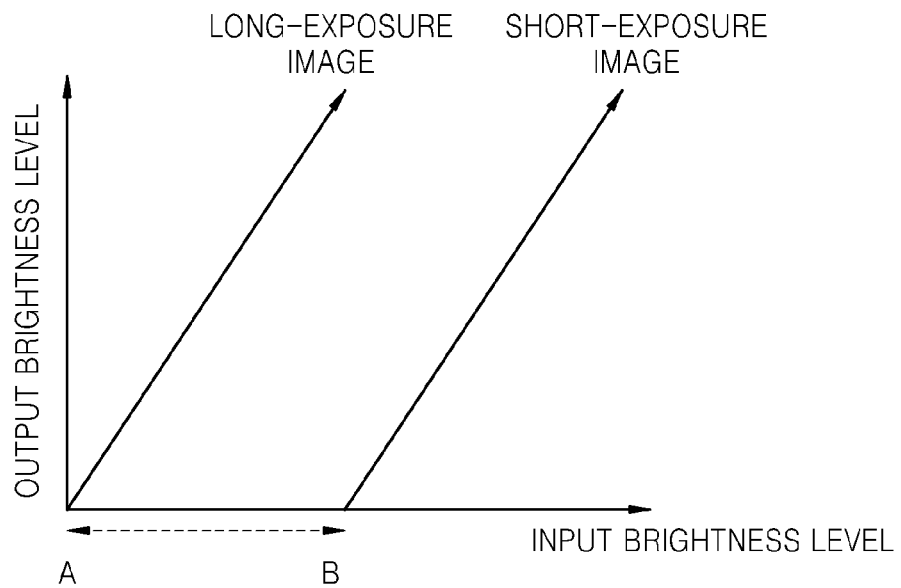
FIGS. 1A and 1B are graphs illustrating a motion blur occurring when a wide dynamic range (WDR) function of the related art is performed.
Figure 1B:
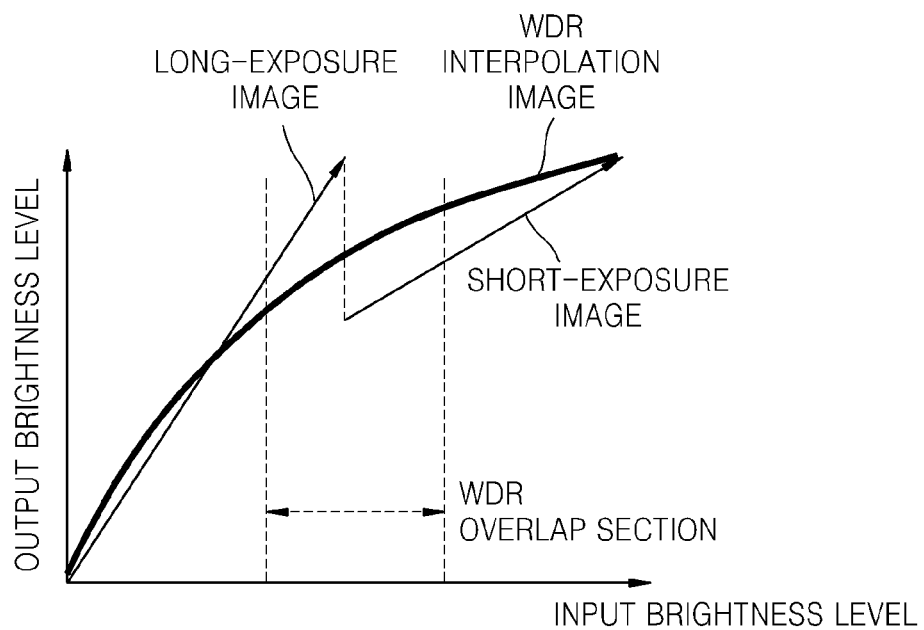

The following description exemplifies only the principles of certain exemplary embodiments and may allow various kinds of change or modification and various changes in form. Specific exemplary embodiments will be illustrated in drawings and described in detail in the specification. However, it should be understood that the specific exemplary embodiments do not limit the exemplary embodiments to a specific disclosed form, but include every modification, equivalent, or replacement within the spirit and technical scope of the exemplary embodiment. In the following description, well-known functions or constructions will not be described in detail so as not to obscure the exemplary embodiments with unnecessary detail.

Although terms, such as 'first' and 'second', may be used to describe various elements, the elements are not limited by the terms. The terms may be used to classify a certain element from another element.

The terminology used herein is used only to describe specific exemplary embodiments and does not have any intention to limit an exemplary embodiment. An expression in the singular includes an expression in the plural unless they are clearly different from each other in context. It should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

Certain exemplary embodiments may be represented with functional blocks and various processing steps. These functional blocks may be implemented by various hardware and/or software configurations for executing specific functions. For example, certain exemplary embodiments may adopt direct circuit configurations, such as memory, processing, logic, and look-up table, for executing various functions under control of one or more processors or by other control devices. The components of the exemplary embodiments may execute the various functions with software programming or software elements, and likewise, certain exemplary embodiments may be implemented by a programming or scripting language, such as C, C++, Java, or assembler, with various algorithms implemented by a combination of a data structure, processes, routines, and/or other programming components. Functional aspects may be implemented with algorithms executed by one or more processors. In addition, certain exemplary embodiments may adopt electronic environment setup, signal processing, and/or data processing. The terms, such as "mechanism", "element", "means", and "configuration", may be widely used and are not limited to mechanical and/or physical configurations. The terms may include the meaning of a series of routines of software in association with a processor.

Hereinafter, the exemplary embodiments will be described more fully with reference to the accompanying drawings, in which the exemplary embodiments are shown. Like reference numerals in the drawings denote like elements, and thus their repetitive description will be omitted.

Figure 2:
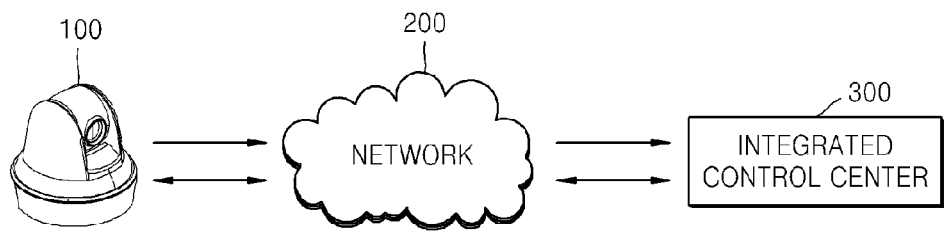
FIG. 2 is a configuration diagram of an image monitoring system according to an exemplary embodiment.

FIG. 2 is a configuration diagram of an image monitoring system according to an exemplary embodiment. Referring to FIG. 2, the image monitoring system includes a monitoring camera 100, a network 200, and an integrated control center 300.

The monitoring camera 100 may be a speed dome camera disposed at a fixed location of a specific space. In addition, the monitoring camera 100 may be a PTZ camera having pan, tilt, and zoom functions. The monitoring camera 100 generates a live image that is an image for a specific place, which is obtained by the PTZ functions. In addition, the monitoring camera 100 continuously acquires images while rotating a body thereof at the fixed location by panning about 0° to about 360° and tilting about −5° to about 185° and transmits the acquired images to the integrated control center 300 via the network 200 with wired or wireless communication.

The integrated control center 300 may store or display the images transmitted from the monitoring camera 100 and may control an operation of the monitoring camera 100.

Figure 3:
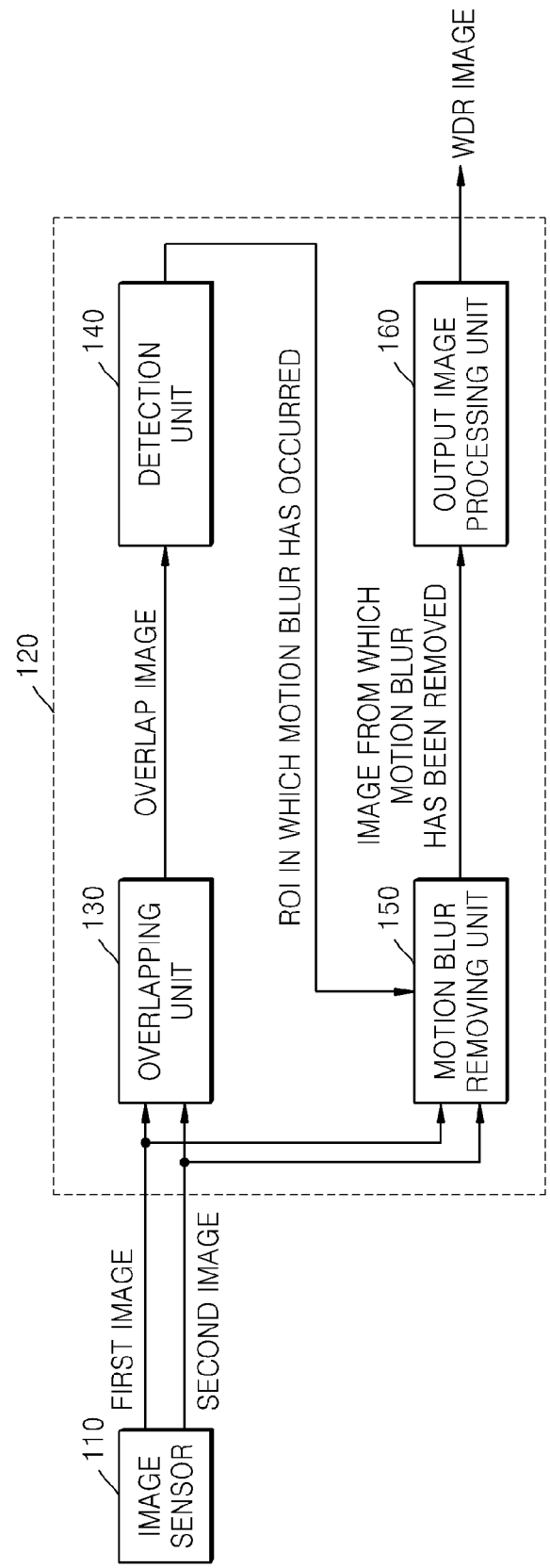
FIG. 3 is a block diagram of an image processing apparatus included in a monitoring camera of the image monitoring system of FIG. 2, according to an exemplary embodiment.

FIG. 3 is a block diagram of an image processing apparatus included in the monitoring camera 100, according to an exemplary embodiment. Referring to FIG. 3, the image processing apparatus may include an image sensor 110 and an image processor 120.

The image sensor 110 generates a first image having a predetermined exposure time and a second image having an exposure time different from that of the first image by converting an optical signal input to the monitoring camera 100 into an electrical signal. The first image may indicate a long-exposure image captured by exposure for a longer time than the second image, the second image may indicate a short-exposure image captured by exposure for a shorter time than the first image, and an exposure time difference between the first image and the second image may be, for example, a factor of eight.

The image sensor 110 may be a charge coupled device (CCD) image sensor, a complementary metal oxide semiconductor (CMOS) image sensor, or the like. The image sensor 110 including the CMOS is advantageous, in terms of power sustainability of the monitoring camera 100 using a battery, because of the low power consumption required for capturing images, the increase in an area of an image pickup device because of relatively low manufacturing costs of the CMOS, and the ease of mass production. The image sensor 110 including a CCD is advantageous in terms of a quick storage speed and excellent image quality since the CCD generates much less noise and has a quicker image information transfer speed than the CMOS.

Figure 4A:
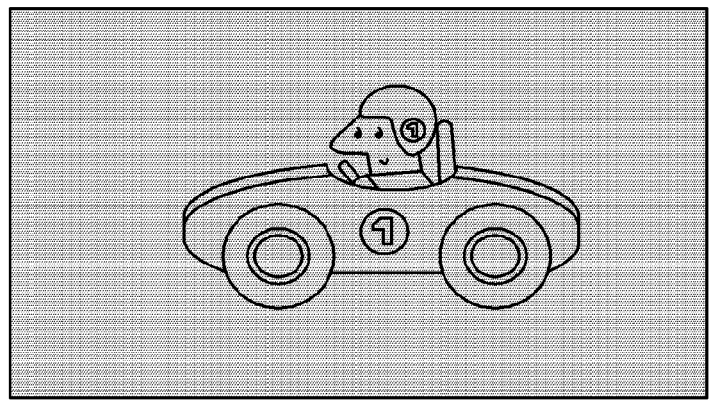
FIGS. 4A to 4G illustrate image processing for removing a motion blur in the image processing apparatus of FIG. 3.
Figure 4B:
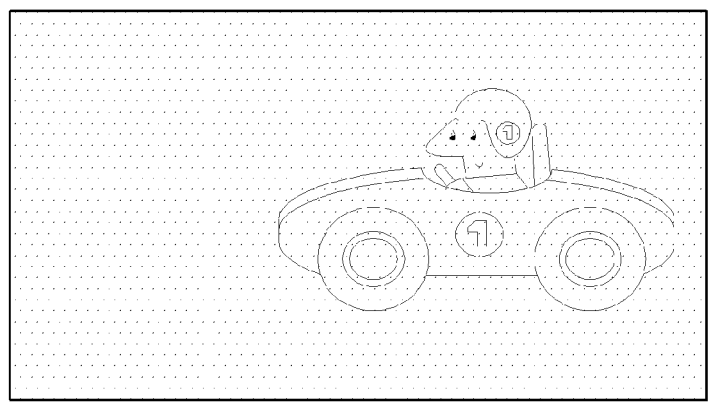

FIG. 4A illustrates the first image as a long-exposure image. When an exposure time is longer, an amount of accumulated light increases more, thereby varying gray scale rendition of a dark part. However, in this case, a bright area may be saturated, thereby being out of a range of gray scale rendition. FIG. 4B illustrates the second image as a short-exposure image. When an exposure time is shorter, an amount of accumulated light is less, thereby varying gray scale rendition of a bright part but causing gray scale rendition of a dark area to be insufficient.

The image processor 120 overlaps the first image and the second image having a physical time difference therebetween for a moving object, which are output from the image sensor 110, removes a motion blur from the overlap image by using a first machine learning algorithm, signal-processes the image from which motion blur has been removed by using a second machine learning algorithm, and outputs a final wide dynamic range (WDR) image from which motion blur has been removed. The image processor 120 may include an overlapping unit 130, a detection unit 140, a motion blur removing unit 150, and an output image processing unit 160.

Figure 4C:
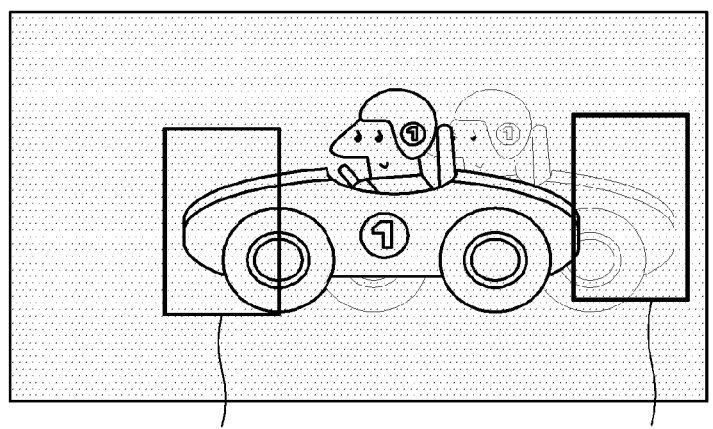

The overlapping unit 130 overlaps the first image and the second image having a physical time difference therebetween for a moving object, which are output from the image sensor 110. FIG. 4C illustrates an overlap image obtained by overlapping the first image shown in FIG. 4A with the second image shown in FIG. 4B. Referring to the overlap image shown in FIG. 4C, a first motion blur and a second motion blur have occurred due to the physical time difference for the moving object.

The detection unit 140 detects a region of interest (ROI) in which a motion blur has occurred from the overlap image. The detection unit 140 detects an edge from the overlap image and detects an ROI including a detected edge line (outline). This edge detection method includes an algorithm for detecting an edge component value forming an edge line (outline) of an object included in an overlap image by using an edge operator.

The edge component value indicates a discontinuous value between a gradation value of a designated arbitrary pixel and a gradation value of a neighboring pixel when the arbitrary pixel and the neighboring pixel adjacent to the arbitrary pixel are designated from among pixels forming the edge line. The discontinuous value may be defined as a difference value between the gradation value of the arbitrary pixel and the gradation value of the neighboring pixel or a value obtained by digitizing a change ratio between the gradation value of the arbitrary pixel and the gradation value of the neighboring pixel. The discontinuous value may be detected by using an edge operator. Examples of the edge operator are a homogeneity operator, a difference operator, a differential operator, a compass gradient operator, a Laplacian operator, a Laplacian of Gaussian (LoG) operator, and the like.

Figure 4D:
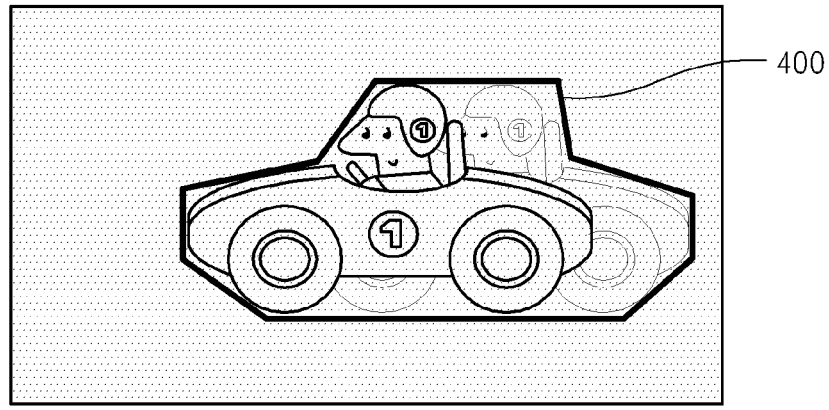

The detection by the detection unit 140 of the ROI in which a motion blur has occurred may use a face detection method instead of the edge detection method described above, but is not limited thereto and may use other various detection algorithms. FIG. 4D illustrates an ROI 400 in which a motion blur has occurred by applying an edge detection algorithm to the overlap image shown in FIG. 4C.

The motion blur removing unit 150 removes the motion blur in the ROI 400 by changing an image of the ROI 400 to the first image or the second image by applying the first machine learning algorithm.

A machine learning algorithm indicates a field of developing an algorithm and technology allowing a computer to learn as one field of artificial intelligence. The machine learning algorithm may be largely classified into neural network, data mining, decision tree, pattern recognition, reinforcement learning, and the like. The machine learning algorithm may increase accuracy of determination with respect to data based on experiences, and when input data is transformed to an available form and accumulated, classification or usage of data input under a specific circumstance or condition may be performed so as to be suitable for each specific circumstance or condition. In the current exemplary embodiment, the decision tree and the pattern recognition are used as the first machine learning algorithm for removing a motion blur, and the reinforcement learning is used as the second machine learning algorithm for processing an output image. However, the current exemplary embodiment is not limited thereto and may use other various algorithms.

Figure 5A:
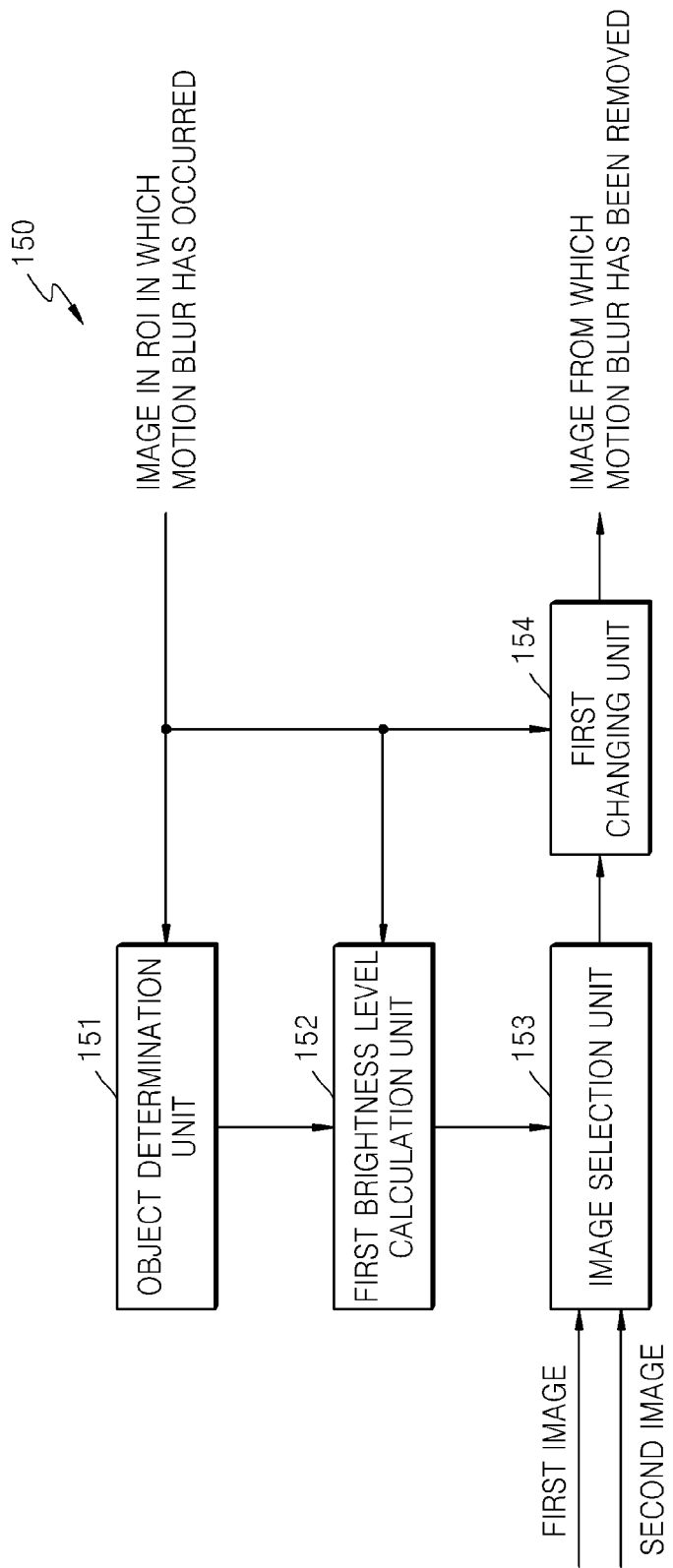
Figure 5C:
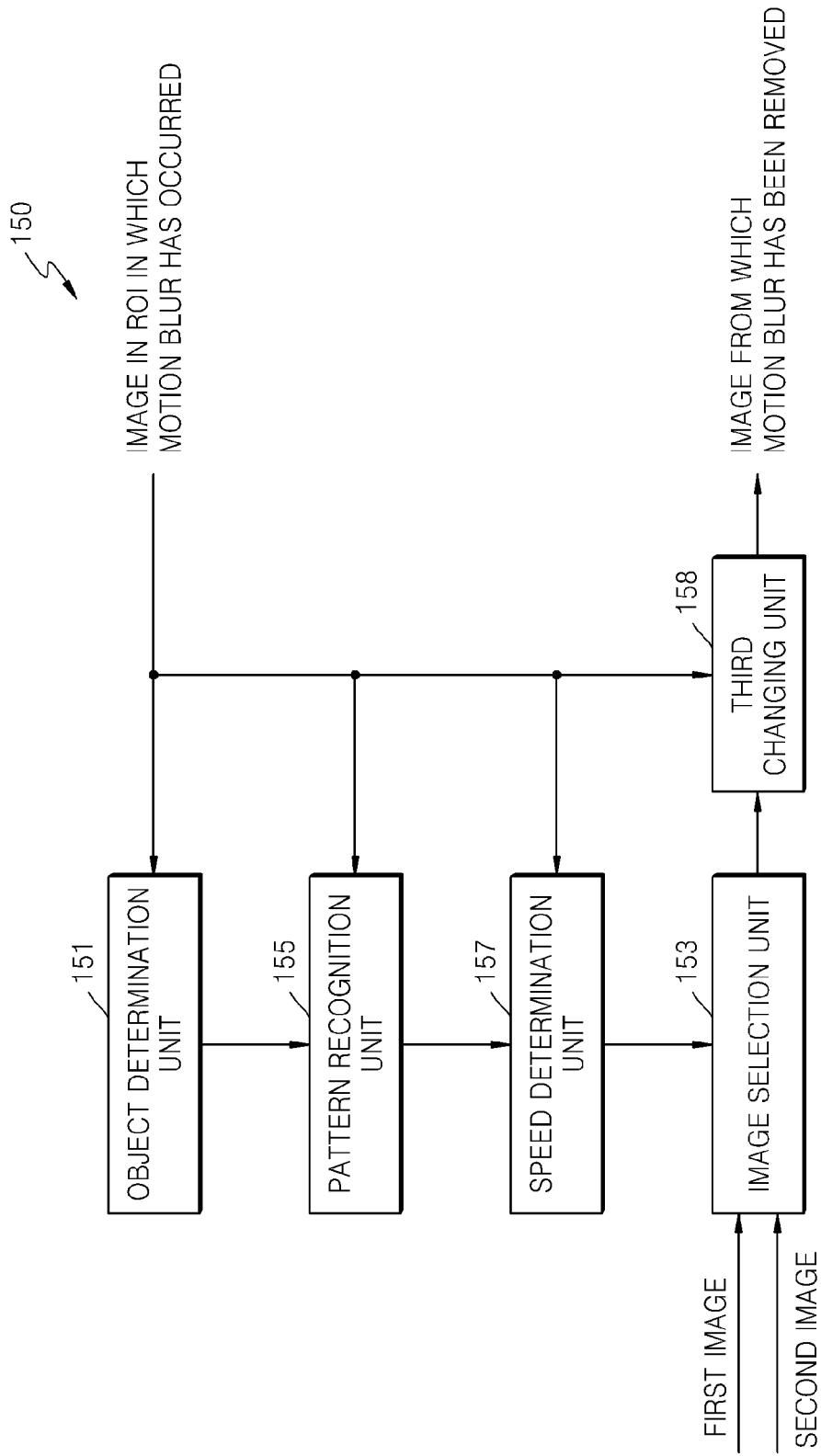

FIGS. 5A to 5C are block diagrams of the motion blur removing unit 150 using the first machine learning algorithm, according to an exemplary embodiment.

First, operation of the motion blur removing unit 150 will now be described with reference to FIG. 5A. Referring to FIG. 5A, the motion blur removing unit 150 includes an object determination unit 151, a first brightness level calculation unit 152, an image selection unit 153, and a first changing unit 154.

The object determination unit 151 determines whether a moving object exists in the image from which the ROI 400 shown in FIG. 4D has been detected. The object determination unit 151 may determine the presence and/or absence of a moving object through an image comparison in the ROI 400 between previous and subsequent frames.

The first brightness level calculation unit 152 calculates a mean brightness level of the image in the ROI 400 when a signal indicating that a moving object does not exist in the image from which the ROI 400 has been detected is received as a result of the object determination of the object determination unit 151. The first brightness level calculation unit 152 may determine whether the image in the ROI 400 is bright or dark, by comparing the calculated mean brightness level with a first threshold. The first brightness level calculation unit 152 determines that the image in the ROI 400 is dark when the mean brightness level is equal to or less than the first threshold and determines that the image in the ROI 400 is bright when the mean brightness level is greater than the first threshold.

The image selection unit 153 selects the first image or the second image according to the brightness determined by the brightness level calculation unit 152. The image selection unit 153 selects the first image when the mean brightness level is equal to or less than the first threshold and selects the second image when the mean brightness level is greater than the first threshold. The first image is selected when the mean brightness level is equal to or less than the first threshold, because data of the second image includes so much noise that an object is difficult to identify and the object is representable only with data of the first image. The first threshold that is a criterion may be defined as about 80 to about 90 when the maximum brightness of an image is 100.

The first changing unit 154 changes the image in the ROI 400 to a corresponding part of the selected first or second image. The first changing unit 154 outputs an image from which motion blur has been removed by changing the image in the ROI 400 to the first image when the mean brightness level is equal to or less than the first threshold and outputs an image from which motion blur has been removed by changing the image in the ROI 400 to the second image when the mean brightness level is greater than the first threshold.

Figure 4E:
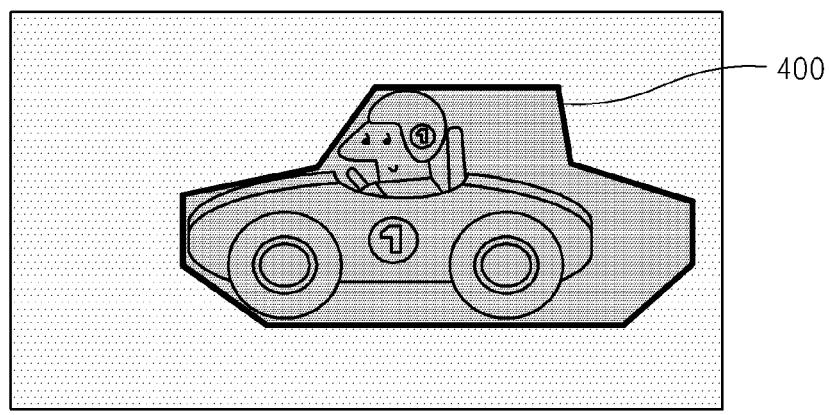

FIG. 4E illustrates an image in which the image in the ROI 400 has been changed to the first or second image. As such, by changing the image in the ROI 400 to the first or second image, a motion blur in the ROI 400 can be removed.

Next, operation of the motion blur removing unit 150 will now be described with reference to FIG. 5B. Referring to FIG. 5B, the motion blur removing unit 150 includes the object determination unit 151, the image selection unit 153, a pattern recognition unit 155, and a second changing unit 156.

The object determination unit 151 determines whether a moving object exists in the image from which the ROI 400 shown in FIG. 4D has been detected. The object determination unit 151 may determine the presence and/or absence of a moving object through an image comparison in the ROI 400 between previous and subsequent frames.

The pattern recognition unit 155 determines whether a moving object in the image in the ROI 400 is a human being based on a learned predetermined pattern when a signal indicating that the moving object exists in the image from which the ROI 400 has been detected is received as a result of the object determination by the object determination unit 151. The pattern recognition unit 155 stores various pre-learned patterns, e.g., a human being, a vehicle number plate, and so on, and may determine whether an object in the image in the ROI 400 is a human being from among the stored patterns by comparing the object in the image in the ROI 400 with the stored patterns.

The image selection unit 153 selects the first image or the second image according to the moving object in the image in the ROI 400, which is determined by the pattern recognition unit 155. The image selection unit 153 selects the first image when the moving object in the image in the ROI 400, which is determined by the pattern recognition unit 155, is a human being and selects the second image when the moving object in the image in the ROI 400, which is determined by the pattern recognition unit 155, is not a human being. When the recognized pattern indicates a human being, the moving object is generally an object of interest when the moving object is placed indoors (in a dark area), rather than outdoors (in a bright area), and since a dark area identification ability is important due to a slow moving speed and a severe contrast on the face, the first image may be mainly used.

The second changing unit 156 changes the image in the ROI 400 to a corresponding part of the selected first or second image. The second changing unit 156 outputs an image from which motion blur has been removed by changing the image in the ROI 400 to the first image when the moving object in the image in the ROI 400 is a human being and outputs an image from which motion blur has been removed by changing the image in the ROI 400 to the second image when the moving object in the image in the ROI 400 is not a human being.

As such, by changing the image in the ROI 400 to the first or second image, a motion blur in the ROI 400 can be removed.

Finally, operation of the motion blur removing unit 150 will now be described with reference to FIG. 5C. Referring to FIG. 5C, the motion blur removing unit 150 includes the object determination unit 151, the image selection unit 153, the pattern recognition unit 155, a speed determination unit 157, and a third changing unit 158.

The object determination unit 151 determines whether a moving object exists in the image from which the ROI 400 shown in FIG. 4D has been detected. The object determination unit 151 may determine the presence and/or absence of a moving object through an image comparison in the ROI 400 between previous and subsequent frames.

The pattern recognition unit 155 determines whether a moving object in the image in the ROI 400 is a human being based on a learned predetermined pattern when a signal indicating that the moving object exists in the image from which the ROI 400 has been detected is received as a result of the object determination of the object determination unit 151. The pattern recognition unit 155 stores pre-learned various patterns, e.g., a human being, a vehicle number plate, and so on, and may determine whether an object in the image in the ROI 400 is a human being from among the stored patterns by comparing the object in the image in the ROI 400 with the stored patterns.

The speed determination unit 157 measures a moving speed of the moving object in the image in the ROI 400 when the moving object in the image in the ROI 400, which is determined by the pattern recognition unit 155, is not a human being and determines whether the moving speed of the moving object is fast or slow by comparing the moving speed with a second threshold. The speed determination unit 157 determines that the moving speed of the moving object is slow when the moving speed of the moving object in the image in the ROI 400 is equal to or less than the second threshold and determines that the moving speed of the moving object is fast when the moving speed of the moving object in the image in the ROI 400 is greater than the second threshold.

The image selection unit 153 selects the first image or the second image according to the moving speed of the moving object in the image in the ROI 400, which is determined by the pattern recognition unit 155. The image selection unit 153 selects the first image when the moving object in the image in the ROI 400, which is determined by the pattern recognition unit 155, moves at a low speed and selects the second image when the moving object in the image in the ROI 400, which is determined by the pattern recognition unit 155, moves at a high speed. When the moving speed of the moving object is fast, if the first image is used, a focus blur effect occurs due to a skidding effect of the moving object, and thus the object feature point detection and identification ability is degraded. Thus, in this case, the second image is used. The second threshold may be defined as a speed corresponding to about 10% to about 20% movement of an object size between a previous image and a subsequent image.

The third changing unit 158 changes the image in the ROI 400 to a corresponding part of the selected first or second image. The third changing unit 158 outputs an image from which motion blur has been removed by changing the image in the ROI 400 to the first image when the moving object in the image in the ROI 400 moves at a low speed and outputs an image from which motion blur has been removed by changing the image in the ROI 400 to the second image when the moving object in the image in the ROI 400 moves at a high speed.

As such, by changing the image in the ROI 400 to the first or second image, a motion blur in the ROI 400 can be removed.

The output image processing unit 160 outputs a final WDR image by changing a part, except for the moving object in the image in the ROI 400, from the image from which motion blur has been removed to a background image of a previous WDR image by applying the second machine learning algorithm.

As shown in FIG. 4E, even though a motion blur has been removed from the image in the ROI 400, there is a bright level difference between the part, except for the moving object in the image in the ROI 400, and the whole background image. Thus, the output image processing unit 160 processes bright levels of the part, except for the moving object in the image in the ROI 400, and the whole background image to be the same.

Figure 6:
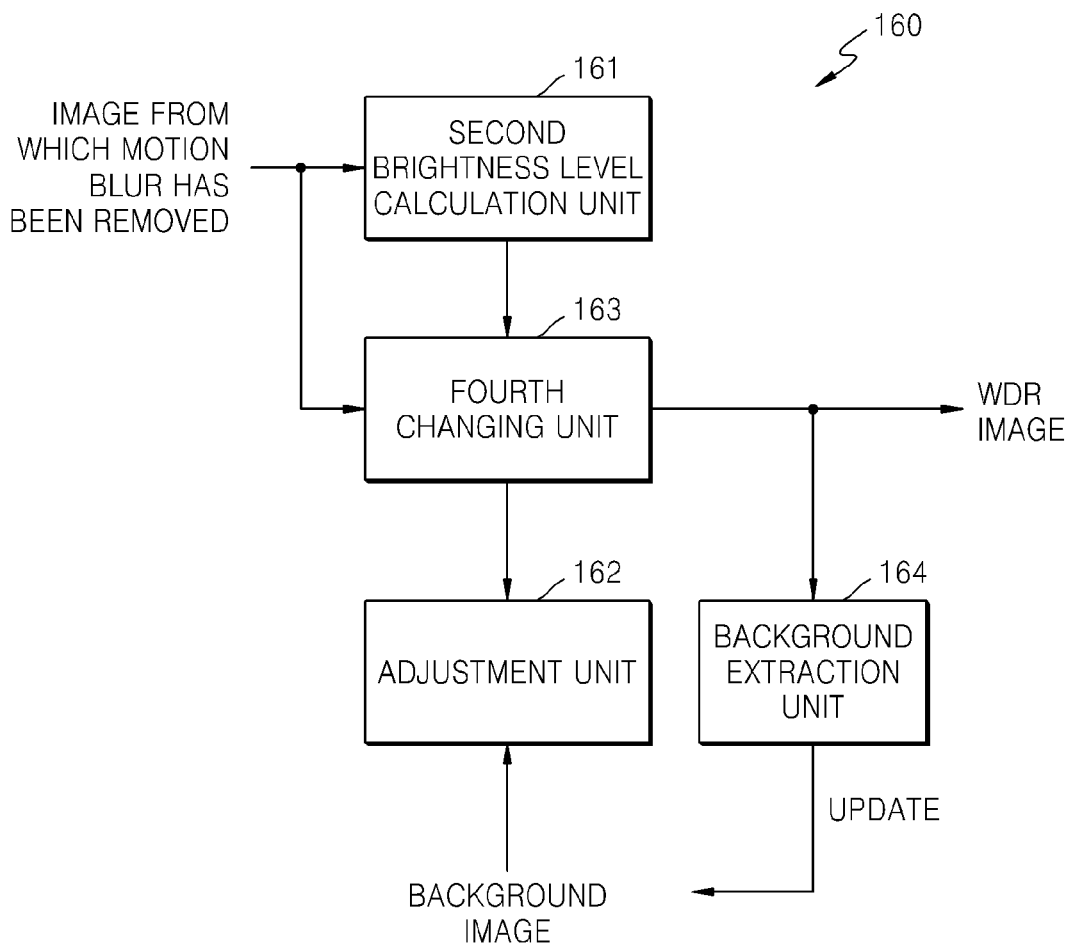
FIG. 6 is a block diagram of an output image processing unit in the image processing apparatus of FIG. 3, according to an exemplary embodiment.

FIG. 6 is a block diagram of the output image processing unit 160 according to an embodiment of an exemplary embodiment. Referring to FIG. 6, the output image processing unit 160 may include a second brightness level calculation unit 161, an adjustment unit 162, a fourth changing unit 163, and a background extraction unit 164.

The second brightness level calculation unit 161 calculates a maximum brightness level and a minimum brightness level of the image in the ROI 400 of the image from which motion blur has been removed.

Figure 4F:
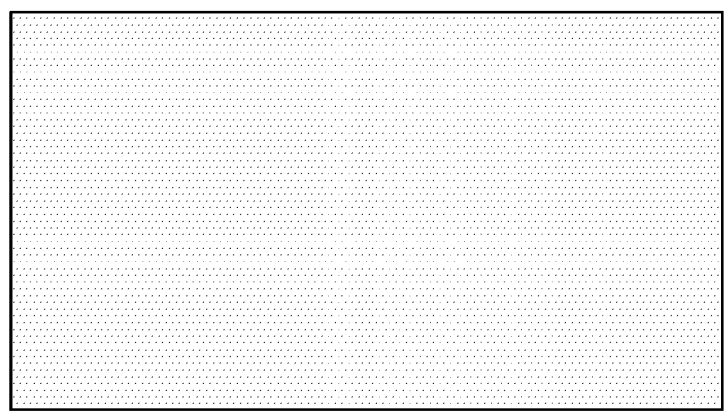

The adjustment unit 162 differently adjusts a brightness ratio of a previous WDR image to a background image according to the maximum brightness level and the minimum brightness level. FIG. 4F illustrates the background image obtained by extracting only a background portion of the previous WDR image. The adjustment unit 162 increases the brightness ratio of the previous WDR image to the background image as the image in the ROI 400 approaches the minimum brightness level and decreases the brightness ratio of the previous WDR image to the background image as the image in the ROI 400 approaches the maximum brightness level.

Figure 4G:
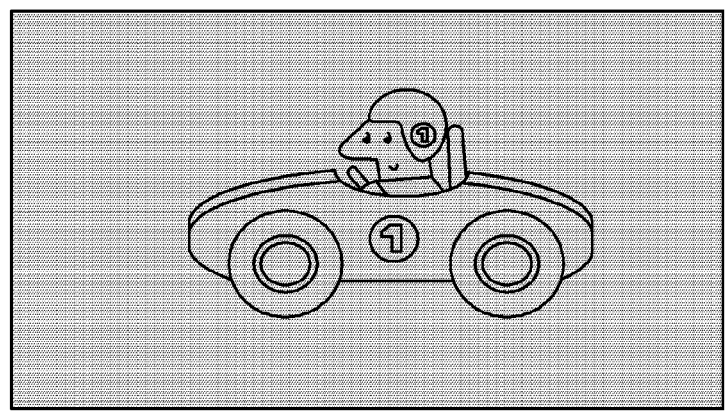

The fourth changing unit 163 outputs a final WDR image by changing the part, except for the moving object in the image in the ROI 400, to the background image to which the brightness ratio has been differently applied. FIG. 4G illustrates the final WDR image obtained by changing the part, except for the moving object in the image in the ROI 400, to the background image to which the brightness ratio has been differently applied. For the final WDR image shown in FIG. 4G, a motion blur on the moving object in the image in the ROI 400 is removed, and in addition, a brightness level of the part, except for the moving object in the image in the ROI 400, is the same as a brightness level of the whole background image.

The background extraction unit 164 detects the background image from the output final WDR image and updates the detected background image as a background image for outputting a subsequent WDR image. There are various methods of detecting and extracting a background image from a WDR image. For example, a frame difference scheme of finding a background area and a foreground area from a difference between two consecutive image frames by comparing the two consecutive image frames with each other may be used, or a color distribution of each pixel may be modeled using one Gaussian function or several Gaussian functions. In addition, instead of modeling the color distribution by using a specific function, a method of classifying each pixel into the foreground area or the background area by representing each pixel as a probability distribution or other methods may be used.

As described above, by using the first image as a long-exposure image and the second image as a short-exposure image, a representable dynamic range may be widened, a motion blur phenomenon of the ROI 400, which occurs when two images are overlapped in real-time by using a machine learning algorithm, may be removed, and a brightness difference between the image in the ROI 400 and the background image may be removed.

A method of processing an image according to an exemplary embodiment will now be described with reference to FIGS. 7 to 9. The method according to an exemplary embodiment may be executed inside the monitoring camera 100 with peripheral components as shown in FIG. 3. In the description below, descriptions related to FIGS. 2 to 6 will not be repeated.

Figure 7:
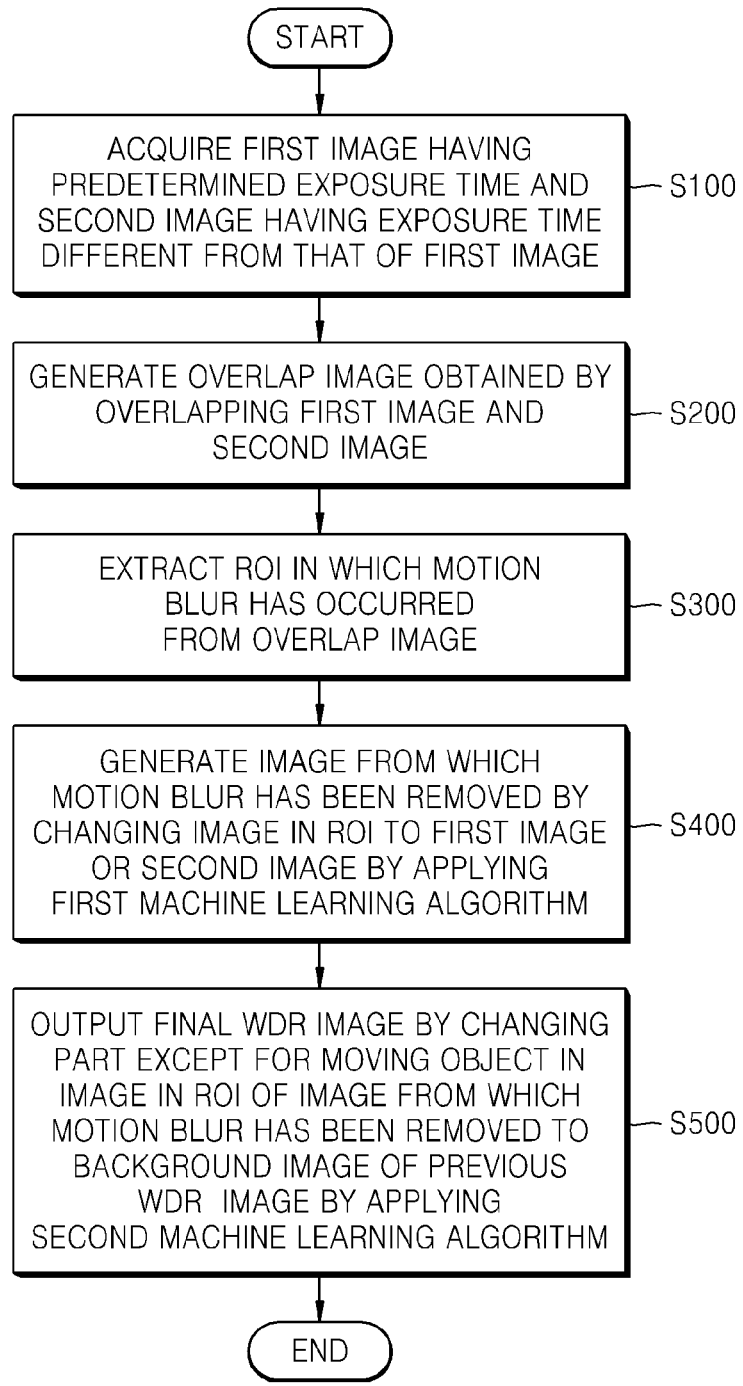
FIG. 7 is a flowchart illustrating a method of processing an image, according an exemplary embodiment.

FIG. 7 is a flowchart illustrating a method of processing an image, according to an exemplary embodiment. Referring to FIG. 7, in operation S100, the monitoring camera 100 generates a first image having a predetermined exposure time and a second image having an exposure time different from that of the first image for a moving object. The first image may indicate a long-exposure image captured by exposure for a longer time than the second image, and the second image may indicate a short-exposure image captured by exposure for a shorter time than the first image.

When the generation of the first image and the second image is completed, the monitoring camera 100 generates an overlap image obtained by overlapping the first image and the second image having a physical time difference for the moving object in operation S200.

When the generation of the overlap image is completed, the monitoring camera 100 detects an ROI in which a motion blur has occurred from the overlap image in operation S300. The monitoring camera 100 detects an edge from the overlap image and detects an ROI including a detected edge line (e.g., an outline).

When the detection of the ROI is completed, the monitoring camera 100 generates an image from which motion blur has been removed by changing an image in the ROI to the first image or the second image by applying the first machine learning algorithm in operation S400.

Figure 8:
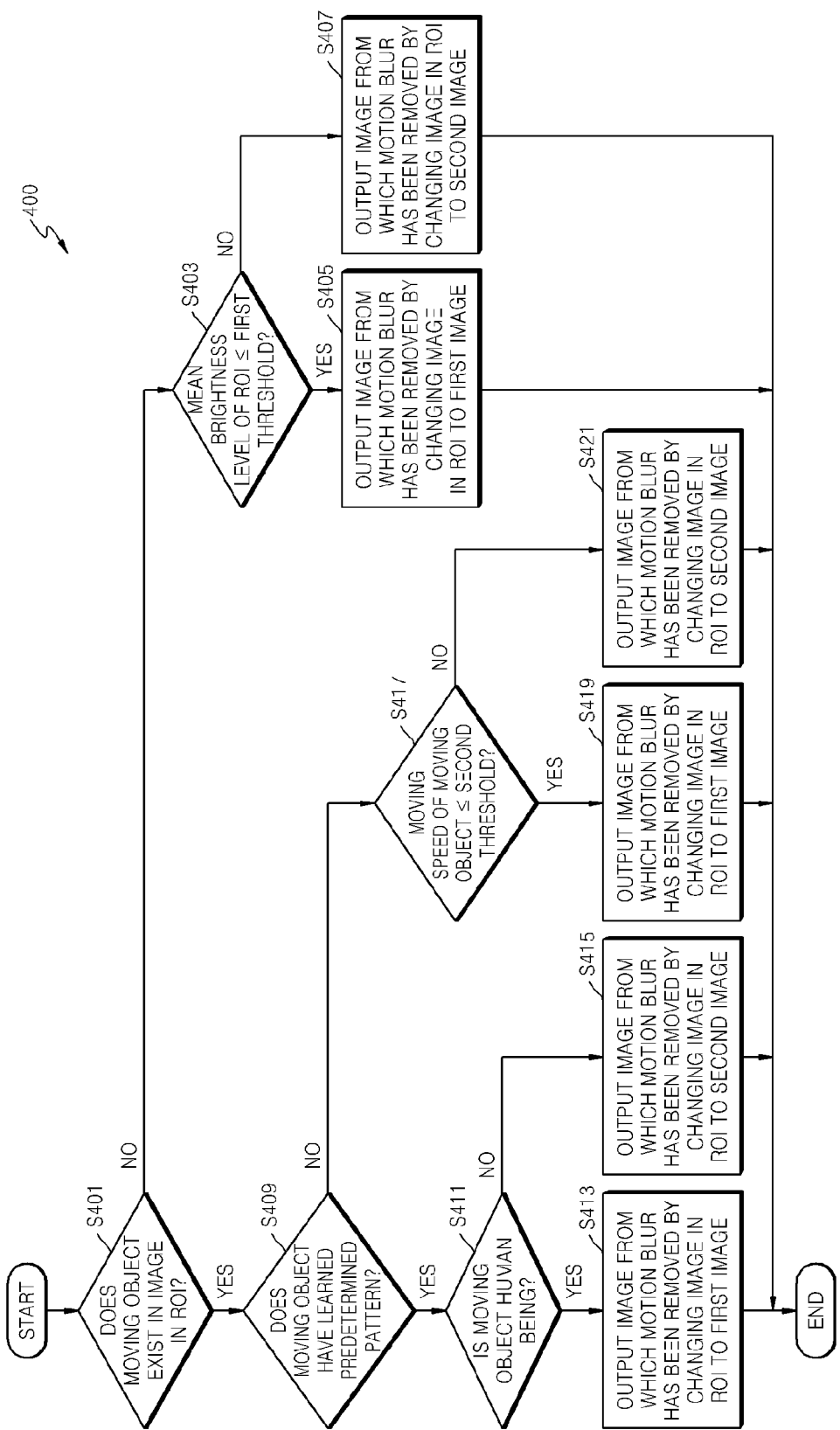
FIG. 8 is a flowchart illustrating a method of generating an image from which motion blur has been removed in the method of FIG. 7, according to an exemplary embodiment.

FIG. 8 is a flowchart illustrating a method of generating the image from which motion blur has been removed by applying the first machine learning algorithm, according to an exemplary embodiment. Referring to FIG. 8, in operation S401, the monitoring camera 100 determines whether a moving object exists in the image in the ROI. The monitoring camera 100 may determine whether a moving object exists through an ROI image comparison between previous/subsequent frames.

As a result of the determination of operation S401, if a moving object does not exist in the image in the ROI, the monitoring camera 100 calculates a mean brightness level of the ROI and determines whether the mean brightness level of the ROI is equal to or less than the first threshold, in operation S403. The monitoring camera 100 may determine whether the image in the ROI is bright or dark by comparing the calculated mean brightness level with the first threshold. The monitoring camera 100 determines that the image in the ROI is dark when the calculated mean brightness level is equal to or less than the first threshold and determines that the image in the ROI is bright when the calculated mean brightness level is greater than the first threshold.

As a result of the determination of operation S403, if the mean brightness level of the ROI is equal to or less than the first threshold, an image from which motion blur has been removed is output by changing the image in the ROI to the first image, in operation S405.

Otherwise, if the mean brightness level of the ROI is greater than the first threshold, an image from which motion blur has been removed is output by changing the image in the ROI to the second image, in operation S407.

As a result of the determination of operation S401, if a moving object exists in the image in the ROI, the monitoring camera 100 determines in operation S409 whether the moving object in the image in the ROI has a learned predetermined pattern. The monitoring camera 100 stores pre-learned various patterns, e.g., a human being, a vehicle number plate, and so on, and may determine whether the moving object in the image in the ROI has a stored pattern by comparing the moving object in the image in the ROI with the stored patterns.

As a result of the determination of operation S409, if the moving object in the image in the ROI has a learned predetermined pattern, the monitoring camera 100 determines in operation S411 whether the moving object in the image in the ROI is a human being.

As a result of the determination of operation S411, if the moving object in the image in the ROI is a human being, the monitoring camera 100 outputs an image from which motion blur has been removed by changing the image in the ROI to the first image, in operation S413.

Otherwise, if the moving object in the image in the ROI is not a human being, the monitoring camera 100 outputs an image from which motion blur has been removed by changing the image in the ROI to the second image, in operation S415.

As a result of the determination of operation S409, if the moving object in the image in the ROI does not have a learned predetermined pattern, the monitoring camera 100 measures a moving speed of the moving object in the image in the ROI and determines whether the moving speed of the moving object in the image in the ROI is equal to or less than the second threshold, in operation S417. The monitoring camera 100 may determine that the moving speed of the moving object is slow when the moving speed of the moving object in the image in the ROI is equal to or less than the second threshold and may determine that the moving speed of the moving object is fast when the moving speed of the moving object in the image in the ROI is greater than the second threshold.

As a result of the determination of operation S417, if the moving speed of the moving object in the image in the ROI is equal to or less than the second threshold, the monitoring camera 100 outputs an image from which motion blur has been removed by changing the image in the ROI to the first image in operation S419.

Otherwise, if the moving speed of the moving object in the image in the ROI is greater than the second threshold, the monitoring camera 100 outputs an image from which motion blur has been removed by changing the image in the ROI to the second image in operation S421.

Referring back to FIG. 7, when the motion blur has been removed from the image in the ROI, the monitoring camera 100 outputs a final WDR image by changing a part, except for the moving object in the image in the ROI, of the image from which motion blur has been removed to a background image of a previous WDR image by applying the second machine learning algorithm, in operation S500. Even though the motion blur has been removed from the image in the ROI, a brightness level difference occurs between the part, except for the moving object in the image in the ROI, and the whole background image, and thus, the final WDR image may be output by processing the brightness levels of the part, except for the moving object in the image in the ROI, and the whole background image to be the same.

FIG. 9 is a flowchart illustrating a method of outputting the final WDR image by applying the second machine learning algorithm, according to an exemplary embodiment. Referring to FIG. 9, the monitoring camera 100 calculates a maximum brightness level and a minimum brightness level of the image in the ROI of the image from which motion blur has been removed in operation S510.

When the calculation of the maximum brightness level and the minimum brightness level of the image in the ROI is completed, the monitoring camera 100 adjusts a brightness ratio of the background image to decrease as the part, except for the object in the image in the ROI, approaches the maximum brightness level in operation S520.

In operation S530, the monitoring camera 100 adjusts the brightness ratio of the background image to increase as the part, except for the object in the image in the ROI, approaches the minimum brightness level.

When the brightness ratio adjustment for the background image is completed, the monitoring camera 100 outputs the final WDR image by changing the part, except for the moving object in the image in the ROI, to the background image for which the brightness ratio has been differently adjusted, in operation S540.

According to this operation, a motion blur on the moving object in the image in the ROI is removed, and in addition, a brightness level of the part, except for the moving object in the image in the ROI, is the same as a brightness level of the whole background image.

After the final WDR image is output, the monitoring camera 100 detects a background image from the output final WDR image and updates the detected background image as a background image for outputting a subsequent WDR image in operation S550.

According to the exemplary embodiments, a motion blur phenomenon, which occurs when a long-exposure image and a short-exposure image are overlapped in real-time, may be removed by using a machine learning algorithm while enlarging a representable dynamic range by using the long-exposure image and the short-exposure image.

The exemplary embodiments may also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network coupled computer systems so that the computer-readable code is stored and executed in a distributed fashion. Also, functional programs, codes, and code segments for accomplishing the exemplary embodiments may be easily construed by programmers of ordinary skill in the art to which the exemplary embodiments pertains.

While the exemplary embodiments have been particularly shown and described, it will be understood by one of ordinary skill in the art that various changes in form and details may be made therein without departing from the spirit and scope of inventive concept as defined by the appended claims. The exemplary embodiments should be considered in a descriptive sense only and not for purposes of limitation. Therefore, the scope of the exemplary embodiments is defined not by the detailed description of the exemplary embodiments but by the appended claims, and all differences within the scope will be construed as being included in the exemplary embodiments.

What is claimed is:

1. A method of processing an image, the method comprising:
    generating an overlap image by overlapping a first image having a predetermined exposure time and a second image having an exposure time different from that of the first image;
    detecting a region of interest (ROI) in which a motion blur occurs in the overlap image;
    performing a motion blur removing operation that changes an image in the ROI to any one of the first image and the second image by applying a first machine learning algorithm; and
    performing an output image processing operation that outputs a wide dynamic range (WDR) image by changing a part, excluding an object in the image in the ROI, of an image from which motion blur has been removed, to a background image of a previous WDR image by applying a second machine learning algorithm.

2. The method of claim 1, wherein the detecting of the ROI comprises:
    detecting an edge in the overlap image; and
    detecting the ROI including an outline of the detected edge.

3. The method of claim 1, wherein the motion blur removing operation comprises:
    determining whether the object is a moving object, through an ROI image comparison between previous and subsequent frames;
    calculating a mean brightness level of the image in the ROI when a moving object does not exist in the image in the ROI;
    changing the image in the ROI to the first image when the mean brightness level is equal to or less than a first threshold; and
    changing the image in the ROI to the second image when the mean brightness level is greater than the first threshold.

4. The method of claim 1, wherein the motion blur removing operation comprises:
    determining whether the object is a moving object;
    determining whether the moving object has a learned predetermined pattern when the moving object exists in the image in the ROI;
    changing the image in the ROI to the first image when it is determined that the moving object has the learned predetermined pattern and when the moving object is a human being; and
    changing the image in the ROI to the second image when it is determined that the moving object has the learned predetermined pattern and when the moving object is not a human being.

5. The method of claim 1, wherein the motion blur removing operation comprises:
    determining whether the object is a moving object;

determining whether the moving object has a learned predetermined pattern when the moving object exists in the image in the ROI;

determining a speed of the moving object when it is determined that the moving object does not have the learned predetermined pattern;

changing the image in the ROI to the first image when the speed of the moving object is equal to or less than a second threshold; and changing the image in the ROI to the second image when the speed of the moving object is greater than the second threshold.

6. The method of claim 1, wherein the output image processing operation comprises:

calculating a maximum brightness level and a minimum brightness level of the image in the ROI of the image from which motion blur has been removed;

differently adjusting a brightness ratio of the previous WDR image to the background image according to the maximum brightness level and the minimum brightness level; and outputting the WDR image by changing the part, excluding the object in the image in the ROI, to the background image for which the brightness ratio has been differently adjusted.

7. The method of claim 6, wherein the different adjusting of the brightness ratio comprises:

decreasing the brightness ratio of the background image as the part, excluding the object in the image in the ROI, approaches the maximum brightness level; and increasing the brightness ratio of the background image as the part, excluding the object in the image in the ROI, approaches the minimum brightness level.

8. An apparatus for processing an image, the apparatus comprising:

at least one processor which implements:

an overlapping unit configured to generate an overlap image by overlapping a first image having a predetermined exposure time and a second image having an exposure time different from that of the first image;

a detection unit configured to detect a region of interest (ROI) in which a motion blur occurs in the overlap image;

a motion blur removing unit configured to change an image in the ROI to any one of the first image and the second image by applying a first machine learning algorithm; and an output image processing unit configured to output a WDR image by changing a part, excluding an object in the image in the ROI, of an image from which motion blur has been removed, to a background image of a previous WDR image by applying a second machine learning algorithm.

9. The apparatus of claim 8, wherein the detection unit further comprises an edge detection unit configured to detect an edge in the overlap image, and the ROI including an outline of the detected edge is detected.

10. The apparatus of claim 8, wherein the motion blur removing unit comprises:

an object determination unit configured to determine whether the object is a moving object, through an ROI image comparison between previous and subsequent frames;

a first brightness level calculation unit configured to calculate a mean brightness level of the image in the ROI when a moving object does not exist in the image in the ROI;

a selection unit configured to select the first image or the second image according to the mean brightness level; and a first changing unit configured to change the image in the ROI to the first image when the mean brightness level is equal to or less than a first threshold, and change the image in the ROI to the second image when the mean brightness level is greater than the first threshold.

11. The apparatus of claim 8, wherein the motion blur removing unit comprises:

an object determination unit configured to determine whether the object is a moving object;

a pattern recognition unit configured to determine whether the moving object is a human being having a learned predetermined pattern when the moving object exists in the image in the ROI;

a selection unit configured to select the first image or the second image according to a result of the pattern recognition; and a second changing unit configured to change the image in the ROI to the first image when it is determined that the moving object is a human being, and change the image in the ROI to the second image when it is determined that the moving object is not a human being.

12. The apparatus of claim 8, wherein the motion blur removing unit comprises:

an object determination unit configured to determine whether the object is a moving object;

a pattern recognition unit configured to determine whether the moving object has a learned predetermined pattern when the moving object exists in the image in the ROI;

a speed determination unit configured to determine a speed of the moving object when it is determined that the moving object does not have the learned predetermined pattern;

a selection unit configured to select the first image or the second image according to the speed determination result; and a third changing unit configured to change the image in the ROI to the first image when the speed of the moving object is equal to or less than a second threshold, and change the image in the ROI to the second image when the speed of the moving object is greater than the second threshold.

13. The apparatus of claim 8, wherein the output image processing unit comprises:

a second brightness level calculation unit configured to calculate a maximum brightness level and a minimum brightness level of the image in the ROI of the image from which motion blur has been removed;

an adjustment unit configured to differently adjust a brightness ratio of the previous WDR image to the background image according to the maximum brightness level and the minimum brightness level; and a fourth changing unit configured to output the WDR image by changing the part, excluding the object in the image in the ROI, to the background image for which the brightness ratio has been differently adjusted.

14. The apparatus of claim 13, wherein the adjustment unit is further configured to decrease the brightness ratio of the background image as the part, excluding the object in the image in the ROI, approaches the maximum brightness level, and configured to increase the brightness ratio of the background image as the part, excluding the object in the image in the ROI, approaches the minimum brightness level.

15. A non-transitory computer-readable storage medium having stored therein program instructions, which when executed by a computer, perform a method of processing an image, the method comprising:
- generating an overlap image by overlapping a first image having a predetermined exposure time and a second image having an exposure time different from that of the first image;
- detecting a region of interest (ROI) in which a motion blur occurs in the overlap image;
- a motion blur removing operation of changing an image in the ROI to any one of the first image and the second image by applying a first machine learning algorithm; and
- performing an output image processing operation that outputs a wide dynamic range (WDR) image by changing a part, excluding an object in the image in the ROI, of an image from which motion blur has been removed, to a background image of a previous WDR image by applying a second machine learning algorithm.

* * * * *